Dec. 17, 1935. R. NELSON 2,024,803

PIPE BEADING MACHINE

Filed Aug. 19, 1932

Inventor:
Royden Nelson
By [signature]
Attorney

Patented Dec. 17, 1935

2,024,803

UNITED STATES PATENT OFFICE 2,024,803

PIPE BEADING MACHINE

Royden Nelson, Wellington, New Zealand

Application August 19, 1932, Serial No. 629,543

1 Claim. (Cl. 153—9)

This invention has reference to an improved construction of machine that has been devised for the purpose of forming a bead or circumferential ridge on a pipe's outer surface near its end by the known method under which the pipe wall is forced out from the inside, or is expanded into the ridge. This method of treating the pipe end is to adapt it for combination with any of the well known jointing methods in which a union nut surrounds the pipe end, outside the ridge, and is designed as it is screwed home, to engage the ridge and to force the pipe end in on to a seat and at the same time itself to make a close engagement with the ridge. Such method of jointing is largely employed in connection with pipes made of soft ductile metals, as copper, and the machine designed is intended to be used for operation on such kinds of pipes.

The invention is concerned more particularly with an improved construction of that known type of machine used for this operation in which two parallel side by side mandrel rollers are provided to be rotated together and one of these is formed with a circumferential groove, while the other is formed with a corresponding and coincident circumferential ridge, and the two rollers are designed to move together or apart. The pipe end is passed over the end of the ridged roller, the rollers brought together to grip it and then rotated while the rollers are forced closer. This causes the pipe to be rotated with the ridged roller and for the ridge thereof forcing the wall of the pipe outward into the groove of the other roller so that the bead or ridge is formed on the outside of the pipe.

The machine now designed is adapted for mounting upon a bench and is adaptable for use upon a wide range of sizes of pipes. It is simple in character and quick and effective in operation. The bead or ridge formed thereby is also well defined to ensure of a good joint being effected when associated with the union nut in the ordinary manner.

This machine is illustrated in the accompanying drawing, in which:—

Figure 1:
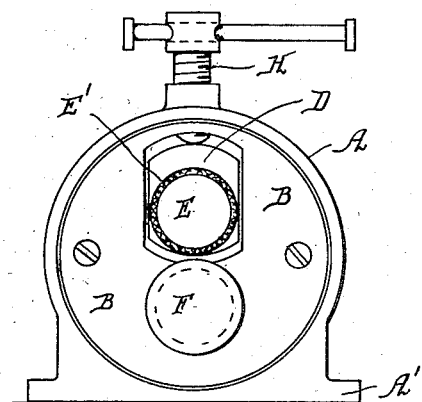
Figure 1 is an inner end elevation of the machine.

The machine in its details of construction, is formed with a metal casing A having a base A' suitable for fixing it firmly upon a working bench. The inner end of the casing is provided with a face plate B closing such end and having in its lower part a fixed bearing C and in its upper part a vertically sliding bearing D. The casing A at its outer end is also made with two bearings one above the other.

Two mandrel rollers E and F are provided and are arranged to extend through the casing one above the other, the upper mandrel roller E being fitted loosely at its outer end in the upper bearing of that end of the casing and passing at its inner end through the sliding bearing D of the face plate B to extend a distance beyond its surface. This mandrel roller is made to project a distance from the inner face of the bearing corresponding with the distance in from the pipe end at which its bead is to be formed, and at its ends is made with the ridge E' which acts as the male former in the operation of the machine. Inside the bead, this mandrel is tapered down slightly in diameter, as shown in the drawing, for a purpose hereinafter explained.

The other mandrel roller F is arranged to extend within the casing and is supported in the lower bearings at the two ends thereof. This at the outer end is continued beyond the casing and has a crank handle G affixed to it for the operation of the mandrels. At its inner end it also extends beyond the face plate B and has a groove F' formed therein that is positioned vertically beneath the ridge E' of the male former E. In this case the mandrel extends a distance beyond the groove.

The male mandrel roller E is thus capable of moving at its inner end in the vertical direction to vary its distance from the female mandrel roller F. It is moved away by lifting it, and towards, by being forced down by the action of a press head H screwing down through the top of the casing and engaging the top of the sliding bearing D, which screw is provided for that purpose.

The two mandrel rollers E and F are geared together within the casing by gear wheels J and K secured thereon and having their teeth so shaped as to retain the engagement with the variations in the male mandrel roller's movements provided for by the construction described. They are thus adapted to be rotated together in mangle fashion by the operations of the said crank handle G.

Figure 5:
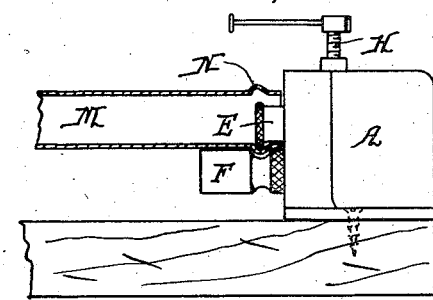
Figure 5 is a sketch, on a smaller scale, showing the method of using the machine.
Figure 6:
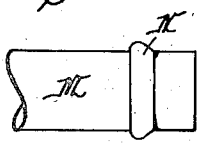
Figure 6 is a view of the pipe end as treated in the machine.

The pipe end M (Figures 5 and 6) to be formed with the ridge N is passed endways over the end of male mandrel roller E until its end engages the face plate B and is held squarely against such plate during the operation. The male mandrel roller E is lowered to clamp the pipe end between the two mandrel rollers and the rotation of the rollers effected, to also roll the pipe between them on its own axis. The male mandrel roller is then gradually forced down by the operation of the press head H, until the metal of the pipe is expanded into the groove of the female mandrel roller in the required manner and as shown in Figure 5. The lifting of the male mandrel roller will then free the pipe end so that it may be drawn away.

It will readily be understood that instead of the mandrel rollers being disposed one above the other, they may be arranged side by side with the bearing D mounted to slide across within the face plate B of the machine.

The ridge E' and the periphery of the mandrel F between the groove F' and the bearing C are preferably made with knurled surfaces as shown, in order to increase their grip upon the pipe end and thereby to more effectively roll it round on its own axis between them.

The formation of the mandrel E with the tapered diameter inside the ridge will ensure against any possibility of the pipe mouth being distended in the rolling operation, as the mandrel then clears the pipe end.

Figure 2:
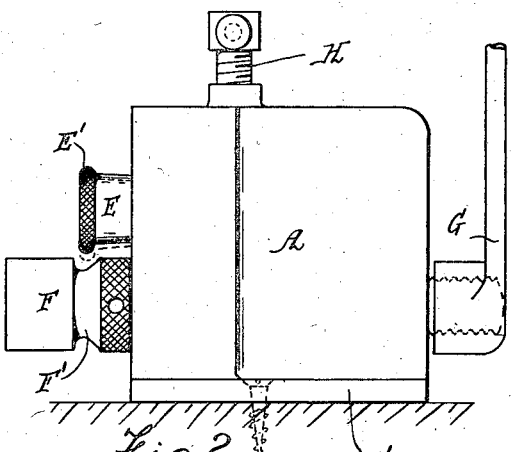
Figure 2 is a side elevation thereof.
Figure 4:
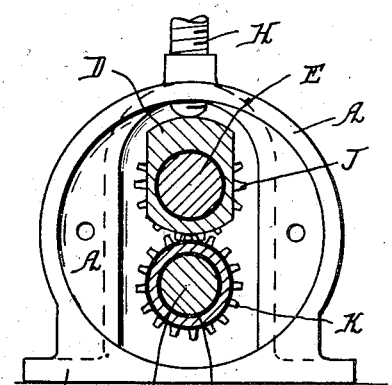
Figure 4 is an inner end sectional elevation taken on the line 4—4 of Figure 3.
Figure 3:
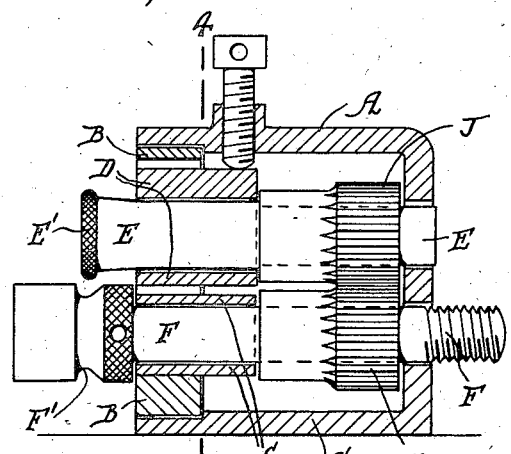
Figure 3 is a sectional side elevation thereof.

The groove F' of the mandrel F is preferably made of a shape by which it tapers more on the outer edge than on its inner, as shown in Figures 2 and 3, so that a bead is formed of the shape shown in Figure 5, to obtain a better alignment of the bead in its jointing.

I claim:—

A pipe beading machine comprising a casing adapted to be secured to a fixture, a sliding bearing block, a pair of cooperating mandrel rollers mounted in parallel relationship to extend through the casing, meshing gears mounted on said rollers in said casing for causing the rollers to be rotated in mangle fashion, one of said rollers having the end extending through the casing formed adjacent its extremity with a circumferential knurled ridge and being rotatably mounted in said sliding bearing block, the other roller having a circumferential groove formed in the portion thereof extending beyond the casing and adapted to cooperate with the ridge formed on the first roller, the portion of the second roller between the groove and the casing being knurled and adapted to cooperate with the portion of the first roller between the ridge and casing, means for adjusting said bearing block toward and away from the grooved roller, and means for rotating the rollers, said ridged roller having the portion between the ridge and the casing slightly tapered to avoid flaring of the end of the pipe being beaded.

ROYDEN NELSON.